July 29, 1969 J. L. SZAJNA 3,457,591

MACHINE FOR MAKING HOLLOW ARTICLES

Filed May 23, 1966

INVENTOR
JOHN L. SZAJNA

BY *William A. Dittmann*

ATTORNEY

United States Patent Office 3,457,591
Patented July 29, 1969

3,457,591
MACHINE FOR MAKING HOLLOW ARTICLES
John L. Szajna, Norridge, Ill., assignor to Continental Can Company, Inc., a corporation of New York
Filed May 23, 1966, Ser. No. 552,304
Int. Cl. B29g 2/00; B29d 23/04
U.S. Cl. 18—5         13 Claims

ABSTRACT OF THE DISCLOSURE

The blow molds is a machine of the continuously-extruded parison type are provided with means restraining flow of air from the parison constricted by each mold. The restraint means precludes or limits flow of air from the captured parison to the following parison, obviating bubble formation. A slide carried on one of the mold halves of each set is actuated upon approach of the mold halves to the parison capture position. The slide acts as a gate, pinching the tube to close or restrict the passage. The restricted condition is maintained until the mold halves register. The slide gate thereupon retracts to its original position relative to the carrier mold half, being actuated to retracted position by the opposing mold half.

---

This invention relates to the machines for making hollow articles from a continuously moving tube of softened plastic material and, more particularly, to an improvement in the machines for making blow molded hollow articles from a continuously moving tube of softened plastic material and having at least a pair of mold halves adapted to move relative to each other.

A detailed description of the typical machines to which the present invention applies is found in U.S. Patent 2,784,452.

Generally, blow molded hollow plastic articles are made from a tube of softened plastic material positioned between two halves of a mold. In closing and opening the two mold halves they can both be movable, or, one mold half can be fixed and the other half movable. In the operation of the above machines, a tube of softened plastic material, called a parison, is continuously extruded to be received by successive series of molds. The respective mold halves register with one another enclosing a portion of the parison therebetween for the purpose of forming a hollow article.

The parison normally contains a quantity of air which is useful to prevent its collapse. However, when the mold halves close in registry with one another and thereby close off an end of the parison, air is pushed out of the segment of the parison being enclosed between the mold halves. The air from the parison portion being enclosed forces into the free portion of the parison and forms a bubble immediately outside of the mold as it closes. Since the parison is continuously fed into a number of molds, the bubble configuration formed therein is undesirable as it distorts the shape requirements of the parison for the next mold.

Thus, there is a need to control the shape of the parison in each mold and in particular to avoid interference with the parison shape from the preceding mold closing operation. According to the present invention, such control is effected by a restriction of the parison co-ordinated with a mold closing operation. Depending upon the extent of restriction, the formation of the bubble is completely or partially eliminated.

An object of this invention is to provide a combination for controlling the air movement in a continuously moving tube of softened plastic material when a portion thereof is to be enclosed in a mold for formation of a hollow article.

Another object of this invention is to provide a combination to eliminate formation of a bubble in a portion of the tube of softened plastic material immediately next to the closed mold.

Still another object of this invention is to provide a plastic molding machine for handling repetitive molds from a continuously extruding parison or tube of softened plastic material which will control the shape of the parison to be received in each succeeding mold.

Yet another object of this invention is to provide parison molding tube shape restricting means which is inexpensive and which can be installed for operation with the existing blow molding machines for making hollow plastic articles.

Further objects and advantages will become apparent from the following detailed description taken in connection with the accompanying drawing in which.

Figure 1:
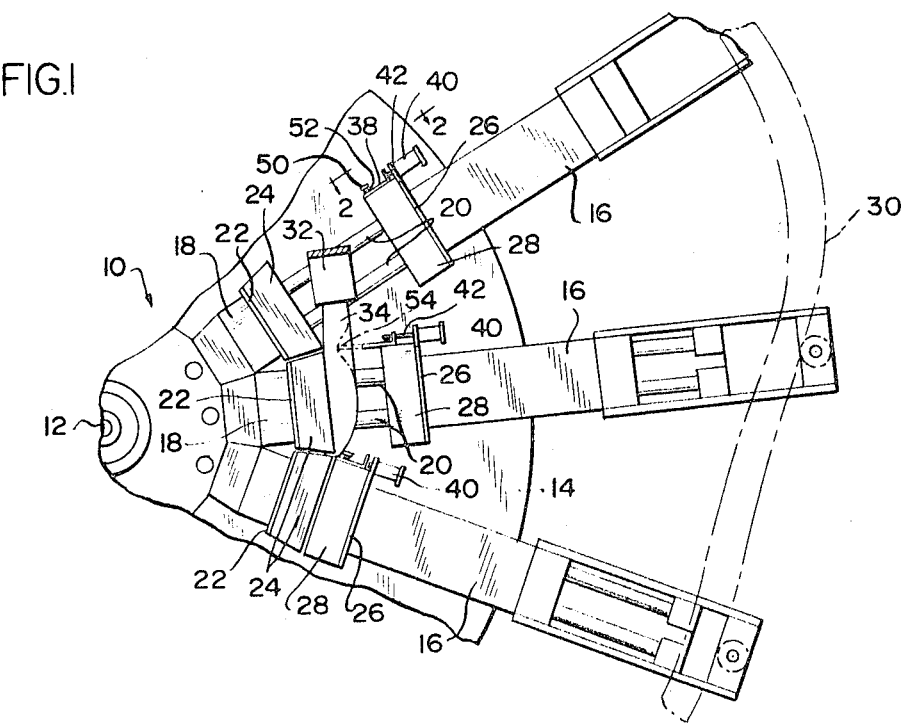
FIG. 1 is a schematic elevational view of a portion of a machine with radially moving molds for forming hollow articles and embodying the present invention.

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

In a typical example of the machines, as disclosed in the aforementioned U.S. patent to which this invention applies, a plurality of molds are mounted on a common shaft and rotated in a common plane. Each of the molds is formed in halves which open to receive the tube. A parison is continuously extruded by an extruded with the mold halves passing on opposite sides of the extruder head. As the mold halves close, they close about a portion of the parison, the molds being designed to pinch the parison and to seal off opposite ends of the portion thereof disposed within the mold. To prevent a collapse of the parison, the parison contains a quantity of air. When the mold halves begin to close, part of this air is forced out of the portion of the parison to be enclosed and into the portion of the parison outside of the mold where it forms a bubble.

An exemplary embodiment of the invention illustrated herein comprises a slide member mounted in a guide track secured to one of the above mold halves. In a machine having a fixed mold half and a movable mold half, the slide is preferably positioned on the movable half. Moving means, such as an air cylinder having a piston, is mounted on the same mold half as the slide. Responsive to the relative movement of the mold halves, the piston of the air cylinder engages the slide member and advances the same toward the other mold half to controllably engage the tube, or parison, located between the two mold halves. The engagement of the slide member with the tube produces a pinching effect on the tube so that its cross-section is restricted to a desired amount. When the slide member is placed in proper engagement with the tube, the piston, which advanced the slide member, retracts into the air cylinder. A coil spring, provided on the slide member, can be adjusted to give the slide sufficient tension so that it remains stationary and does not retract upon contacting the tube. The pinching effect provided by the slide upon the tube restricts the air flow from the tube, thus preventing the formation of a bubble in the portion of the tube which is outside of the closed mold. When the mold halves come into a substantial registry, the slide member contacts the edge of the opposite mold half and is thereby pushed back into its former non-operating position. When the mold halves register, a hollow article is formed by blow molding as described in the above U.S. patent.

Referring now to the drawing, FIG. 1 shows a portion of a machine, generally designated 10, for making hollow articles. Since a complete disclosure of the machine 10 is found in the U.S. Patent 2,784,452, only those components of the machine directly involved with this invention will be described in detail herein.

The machine 10 includes a main shaft 12 which is suitably journaled for rotation and which is driven by mechanism (not shown). A disc-like mold assembly carrier 14 is secured to the shaft 12 by suitable means for rotation therewith. A plurality of arms, or mold units, generally referred to by the numeral 16, are secured to the face of the mold assembly carrier 14 in radiating, circumferentially spaced relationship. Each of the arms 16 includes a support bracket 18 which is suitably secured to the face of the carrier 14. The bracket 18 supports a pair of spaced-apart parallel rods 20 disposed in parallel relationship to the carrier 14. A fixed mold support 22 is secured to the inner ends of the rods 20. A fixed mold half 24 is relatively secured to the fixed mold support 22. A movable mold support 26 is slidably mounted on the rods 20 for movement towards and away from the fixed mold half 24. A movable mold half 28 is carried by the movable mold support 26 and cooperates with the fixed hold half 24.

As the mold assembly carrier 14 rotates, the movable mold halves 28 will move in and out relative to the fixed mold halves 24, as best seen in FIG. 1. This movement of the movable mold halves 28 is accomplished by means of a cam 30.

An extruder for plastics, having an extrusion head 32, is mounted in such a way that its extrusion head 32 is so located that the mold halves 24 and 28, which are open when they pass the head 32, pass on opposite sides of said head. After each arm 16 passes the extrusion head 32, the movable mold half 28 begins to move toward the fixed mold half 24. A tube 34 of softened plastic material, or a parison, is extruded through the extrusion head 32 and is positioned between the mold halves 24 and 28.

Figure 2:
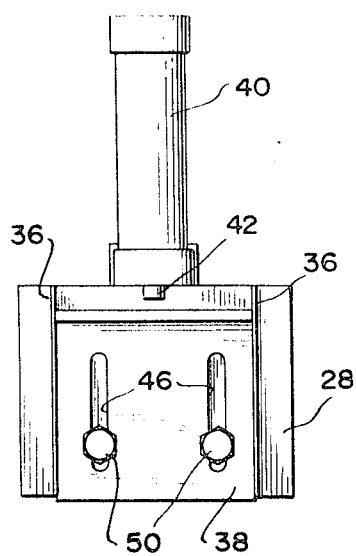
FIG. 2 is a sectional view on an enlarged scale taken generally along the line 2—2 of FIG. 1.
Figure 3:
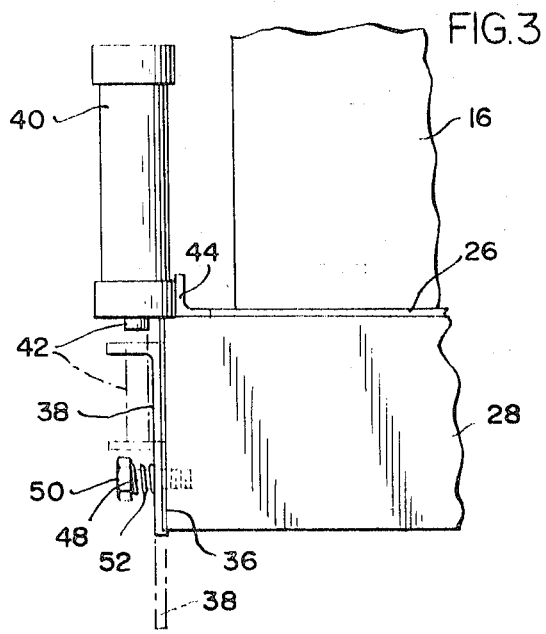
FIG. 3 is a fragmentary view on an enlarged scale showing a mold half embodying the present invention.

A slide track 36, best seen in FIG. 2, is releasably secured to one end of the movable mold half 28. A slide member 38, having a substantially rectangular configuration, is slidably mounted in the track 36. An air cylinder 40, having a piston 42, is attached to the movable mold half 28 by a bracket 44, or in any other convenient manner, to allow engagement of the slide member 38 by the piston 42.

The slide 38 is provided with a pair of elongated slots 46, as shown in FIG. 2. Located within each of the slots 46, there is a threaded stud 48 having a head 50 and extending into the mold half 28. A coil spring 52 is positioned about the stud 48 and is adjustable by the operation of the head 50. The purpose of the spring 52 is to be explained in detail later.

Responsive to the movement of the movable mold half 28 toward the fixed mold half 24, the piston 42 of the air cylinder 40 contacts the vertical portion of the slide member 38 and advances the slide 38 in the direction of travel of the mold half 28 toward the fixed mold half 24. The piston 42 moves the slide 38 a predetermined amount and into an engagement with the tube 34 located between the mold halves 24 and 28. When the slide 38 is advanced a desired distance, the piston 42 retracts into the air cylinder 40. To prevent retraction of the slide member 38 after the piston 42 retracts while the slide member is in engagement with the tube 34, the adjustable coil spring 52 is provided. By manipulating the head 50 of the threaded stud 48 an adjustment of said coil spring can be made to vary the friction on the slide member 38 thus controlling the slidability thereof.

The engagement of the slide 38 with the tube 34 produces a pinching effect on the tube 34 as indicated at 54 in FIG. 1. When the movable mold half 28 is in close proximity to the fixed mold half 34, the tube 34 is subjected to squeezing between said mold halves by action of the moving mold half 28 thereon. Normally, the tube 34 carries a quantity of air which is necessary to prevent a collapse of the tube. A part of the air is forced from the portion of the tube 34 being enclosed between the mold halves and into the portion of said tube outside the mold halves where it may form an undesirable bubble or distortion.

The provision of the slide member 38 and its engagement with the tube 34 controls the amount of air being forced from the portion of the tube being enclosed and prevents formation of said bubble.

When the mold halves 24 and 28 are in a substantial registry enclosing a portion of the tube 34 therebetween, the front edge of the slide member 38 contacts the side of the fixed mold half 24 and the slide 38 is pushed back toward the cylinder 40 and out of engagement with the tube 34.

A hollow plastic article can then be formed in the manner described in the above U.S. patent without a formation of the bubble in the free, or unenclosed, portion of the tube 34 thus maintaining proper shape of the tube 34 for enclosing the same between the succeeding mold halves.

What is claimed is:

1. In combination, a machine for making hollow articles from a continuously moving tube of softened plastic material and having at least a pair of mold halves adapted to move relative to each other and attain registry enclosing a portion of said tube therebetween, a slide member carried by one of said mold halves, means responsive to the movement of said mold halves for advancing said slide member into engagement with said tube, and means for retracting said slide member when said mold halves substantially register with one another.

2. A combination as defined in claim 1, wherein said means for advancing said slide member comprises an air cylinder having a piston extendable therefrom and engageable with said slide member, said piston moving said slide member into engagement with said tube and retracting into said cylinder.

3. A combination as defined in claim 2, wherein said air cylinder is mounted on a mold half carrying said slide member.

4. A combination as defined in claim 1, wherein said slide member engages said tube to controllably restrict the flow of air from the portion of said tube to be enclosed between said mold halves.

5. A combination as defined in claim 4, wherein the engagement of said slide member with said tube restricts the cross-section of said tube at the line of said engagement.

6. A combination as defined in claim 1, wherein said means for retracting said slide member is provided by a contact of said slide member with the opposite mold half when the mold half carrying said slide member is in substantial registry with said opposite mold half.

7. A machine for making hollow articles from continuously moving tube of softened plastic material and having at least a pair of mold halves, first of said mold halves being movable toward the second of said mold halves to effect registry therebetween, said tube positioned between said mold halves and adapted to be enclosed therebetween when said mold halves are in registry, a slide member carried by the first mold half and adjustably movable toward said tube for engagement therewith responsive to the motion of the first mold half, the engagement of said slide member with said tube controllably restricting the flow of air through said tube, and means for retracting said slide member from said engagement when said mold halves are in substantial registry.

8. A machine as defined in claim 7, wherein said slide member is provided with adjustable spring means for controlling the slidability of said member whereby said slide member is retained in said engagement with said tube.

9. A machine as defined in claim 7, wherein said means for retracting said slide member is provided by a contact of said slide member with said second mold half.

10. In a machine for making hollow articles from a continuously moving tube of softened plastic material and having a pair of mold halves movable relative to one another to attain registry enclosing a portion of said tube therebetween, an improvement comprising, a guide track carried at one end of a mold half, a slide movable on said track and extendable therefrom, an air cylinder secured on said mold half carrying said track and having a piston movable therefrom, said piston being adapted to advance said slide into an engagement with said tube responsive to the relative movement between said mold halves and to retract into said cylinder when said slide is in engagement with said tube, an adjustable spring on said slide for controlling the slidability thereof, and said slide restricting the cross-section of said tube to control the flow of air therethrough and adapted to retract from said engagement upon sufficiently contacting the other mold half through said tube when said mold halves are in substantial registry.

11. A combination as defined in claim 10, wherein said slide is of a substantially rectangular configuration.

12. A machine for making hollow articles from a continuously moving tube of softened plastic material and having at least a pair of mold halves adapted to move relative to each other and attain registry enclosing and restricting a portion of said tube therebetween, and means for engaging said tube outside said mold halves responsive to the movement of said mold halves and for restraining the displacement of air within said tube, said means being effective at least in part independently of said movement.

13. A machine as defined in claim 12, wherein said means is retractable from engagement with said tube responsive to the attainment of substantial registry between said mold halves.

References Cited

UNITED STATES PATENTS

| | | |
|---|---|---|
| 2,541,249 | 2/1951 | Hobson. |
| 2,784,452 | 3/1957 | Ruekberg et al. _____ 18—5 |
| 3,032,809 | 5/1962 | Willard _____ 18—5 |
| 3,079,631 | 3/1963 | Gasmire _____ 18—5 X |
| 3,334,379 | 8/1967 | De Settembrini _____ 18—5 |
| 3,339,232 | 9/1967 | Battenfeld et al. _____ 18—5 |
| 3,382,532 | 5/1968 | Schweiger _____ 18—5 |

WILBUR L. McBAY, Primary Examiner

U.S. Cl. X.R.

264—94, 98